(12) United States Patent
Watanabe et al.

(10) Patent No.: US 10,552,674 B2
(45) Date of Patent: Feb. 4, 2020

(54) COMPUTER, DOCUMENT IDENTIFICATION METHOD, AND SYSTEM

(71) Applicant: HITACHI, LTD., Tokyo (JP)

(72) Inventors: Yasuo Watanabe, Tokyo (JP); Toshio Okochi, Tokyo (JP); Hiroshi Shinjo, Tokyo (JP); Masahiro Motobayashi, Tokyo (JP); Yasufumi Suzuki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 138 days.

(21) Appl. No.: 15/918,830

(22) Filed: Mar. 12, 2018

(65) Prior Publication Data

US 2018/0349693 A1 Dec. 6, 2018

(30) Foreign Application Priority Data

May 31, 2017 (JP) .................................. 2017-108312

(51) Int. Cl.
*G06K 9/00* (2006.01)
*G06Q 30/04* (2012.01)

(52) U.S. Cl.
CPC ..... *G06K 9/00469* (2013.01); *G06K 9/00463* (2013.01); *G06K 9/00483* (2013.01); *G06K 2209/01* (2013.01); *G06Q 30/04* (2013.01)

(58) Field of Classification Search
CPC ............... G06K 2209/01; G06K 9/723; G06K 9/00872; G06K 9/72; G06K 9/00442; G06K 9/00469; G06F 17/2785; G06F 17/2765

See application file for complete search history.

(56) References Cited

U.S. PATENT DOCUMENTS 7,630,520 B2 * 12/2009 Visan ....................... G06K 9/38
382/100
7,787,158 B2 * 8/2010 Matsuda .............. G06K 9/2063
358/462

(Continued)

FOREIGN PATENT DOCUMENTS

JP 2004-171316 A 6/2004

OTHER PUBLICATIONS

Hirayama et al., Development of Template-Free Form Recognition System, Sep. 18-21, 2011 [retrieved Sep. 9, 2019], 2011 International Conference on Document Analysis and Recognition, pp. 237-241. Retrieved: https://ieeexplore.ieee.org/abstract/document/6065311 (Year: 2011).*

(Continued)

*Primary Examiner* — Andrew M Moyer
*Assistant Examiner* — Dennis Rosario
(74) *Attorney, Agent, or Firm* — Volpe and Koenig, P.C.

(57) ABSTRACT

A computer, which is configured to extract an attribute being a character string indicating a feature of a paper-based document, the computer stores template information dictionary information. The computer is configured to: execute character recognition processing on image data on the paper-based document; extract an attribute corresponding to each of the at least one type of attribute, which is defined in each of the plurality of templates, through use of a result of the character recognition processing and the plurality of templates; calculate a score regarding the extracted attribute for each of the plurality of templates; select one of the plurality of templates that has the highest extraction accuracy of the attribute based on the score; and generate output information through use of the selected template.

12 Claims, 10 Drawing Sheets

(56) References Cited

U.S. PATENT DOCUMENTS

| | | |
|---|---|---|
| 8,630,949 B2 | 1/2014 | Mclaughlin et al. |
| 2007/0168382 A1* | 7/2007 | Tillberg ............. G06K 9/00449 |
| 2019/0138804 A1* | 5/2019 | Suzuki ............... G06K 9/00442 |

OTHER PUBLICATIONS

Kimura et al., "Modified Quadratic Discriminant Functions and the Application to Chinese Character Recognition", IEEE Transaction on Pattern Analysis and Machine Intelligence vol. PAMI-9. No. 1, Jan. 1987, pp. 149-153.

Takahashi et al., "Development of a Path Search Method in Candidate Character Network Using Recursive Transition Network.", IEICE Technical Report, 2009, vol. 109, No. 418.

* cited by examiner

TEMPLATE INFORMATION 221

| TEMPLATE NUMBER 301 | ATTRIBUTE 302 | POSITIONAL INFORMATION 303 |
|---|---|---|
| 1 | BILLING AMOUNT | (X11,X12) |
|  | BANK NAME | (X21,X22) |
|  | BANK BRANCH NAME | (X31,X32) |
|  | BANK ACCOUNT TYPE | (X41,X42) |
|  | BANK ACCOUNT NUMBER | (X51,X52) |
| 2 | BILLING AMOUNT | (X61,X62) |
|  | BANK NAME | (X71,X72) |
|  | BANK BRANCH NAME | (X81,X82) |
|  | BANK ACCOUNT TYPE | (X91,X92) |
|  | BANK ACCOUNT NUMBER | (X101,X102) |
| ⋮ | ⋮ | ⋮ |

*FIG. 3*

WORD DICTIONARY 222

| ATTRIBUTE 401 | CHARACTER STRING 402 |
|---|---|
| BANK NAME | XXX BANK<br>EKKUSU EKKUSU EKKUSU BANK<br>AA BANK<br>EI EI BANK<br>... |
| BRANCH NAME | YYY BRANCH<br>WAI WAI BRANCH<br>BB BRANCH<br>BII BII BRANCH<br>... |
| ACCOUNT TYPE | FUTSUU<br>TOUZA<br>SAVINGS ACCOUNT<br>CHECKING ACCOUNT<br>(FU)<br>(TOU) |

*FIG. 4*

REPRESENTATION DICTIONARY 223

| ATTRIBUTE | REPRESENTATION |
|---|---|
| ACCOUNT NUMBER | N<br>NN<br>NNN<br>NNNN<br>NNNNN<br>NNNNNN<br>NNNNNNN |
| AMOUNT | ¥NN,NNN<br>NN,NNN YEN<br>... |
| DATE | NNNN. NN. NN<br>NN YEAR NN MONTH NN DAY |

OCR ELEMENT 702

| | ATTRIBUTE | BILLING AMOUNT |
|---|---|---|
| 801 | ATTRIBUTE | BILLING AMOUNT |
| 802 | ITEM VALUE | 「BILLING AMOUNT」; 「10,000YEN」; |
| 803 | POSITION | (x11,x12); (x21,x22); |
| 804 SCORE | REPRESENTATION SCORE | 80 |
| | WORD SCORE | 75 |
| | POSITION SCORE | 26 |
| | AREA SCORE | 30 |
| | ITEM SCORE | 40 |
| | APPEARANCE COUNT SCORE | 2 |

*FIG. 8*

FEATURE VECTOR

| ATTRIBUTE 901 | VALUE 902 |
|---|---|
| BILLING AMOUNT | 80 |
| | 75 |
| | 26 |
| | 30 |
| | 40 |
| | 1 |
| BANK NAME | 64 |
| | ⋮ |
| ⋮ | ⋮ |

TEMPLATE INPUT SCREEN — 1400

1401 — ATTRIBUTE / BILLING AMOUNT / BANK NAME / BANK BRANCH NAME / BANK ACCOUNT TYPE / BANK ACCOUNT NUMBER

1402 — ADD

1403 — INVOICE
- TOTAL: aaaaa
- ITEM A: bbbbb
- ITEM B: ccccc

TRANSFER DESTINATION ACCOUNT
- ddddd
- eeeee
- fffff
- ggggg

1404 — REGISTER

| ID | EXAMINATION RESULT | DOCUMENT SUMMARY INFORMATION | CLASSIFICATION RESULT | SCORE |
|---|---|---|---|---|
| 1 | Accept | http://xxxxxxxxxx | CASE 0 | 77 |
| 2 | Accept | http://xxxxxxxxxy | CASE 2 | 38 |
| 3 | Reject | http://xxxxxxxxzzz | CASE 1 | 55 |
| ⋮ | ⋮ | ⋮ | ⋮ | ⋮ | ns
COMPUTER, DOCUMENT IDENTIFICATION METHOD, AND SYSTEM

CLAIM OF PRIORITY

The present application claims priority from Japanese patent application JP 2017-108312 filed on May 31, 2017, the content of which is hereby incorporated by reference into this application.

BACKGROUND OF THE INVENTION

This invention relates to a computer, method, and system for identifying a document.

The progress of digitization is accompanied by an increase in opportunities to use electronic applications. In the electronic applications, not all subject documents are digitized, and there are often used, documents made of paper or images created by scanning paper.

In this specification, a document converted into an electronic form is referred to as "electronic-based document", and not only a document made of paper but also an image created by scanning paper is referred to as "paper-based document". The electronic-based document and the paper-based document are also referred to simply as "document" when not distinguished from each other.

For example, a procedure performed in work involving receipts and disbursements in a company includes: (1) receiving, by an applicant, a bill from a biller; (2) submitting, by the applicant, a bill for instructing to pay a billing amount to the biller, to a finance department through an electronic application; and (3) paying, by the company, the billing amount to the biller when a person belonging to the finance department determines that the electronic application is proper after verifying an attribute described in the bill.

In this case, the attribute represents a subject of examination, and also represents a character string indicating a feature of the document. For example, in a case of the work involving receipts and disbursements, the attribute corresponds to a charge amount, a bank account number of a transfer destination to which the charged amount is to be transferred, or other such information.

In a case of an electronic application handling a paper-based document, it is required for a person to verify the paper-based document, which raises a problem in that efficiency of work is low and a cost required for the work is large.

In order to solve the above-mentioned problem, there is known a method of reading the attribute from the paper-based document through use of an optical character recognition (OCR) technology. For example, the technology described in U.S. Pat. No. 8,630,949 B2 is known.

U.S. Pat. No. 8,630,949 B2 includes the description "A method of electronically presenting bills for a customer, comprising: . . . receiving an electronic bill and a paper bill for the customer . . . ; scanning the paper bill . . . to generate electronic image information; extracting first optical character recognition (OCR) data from the electronic image information; searching the first OCR data for at least one numeric identifier of a type of the scanned paper bill; identifying the type of the scanned paper bill by comparing the at least one numeric identifier; extracting second OCR data from the electronic image information using a template corresponding to the identified bill type; extracting billing information from the second OCR data; comparing the extracted billing information with known information; . . . combining the electronic bill and the extracted billing information into a customer bill presentation; and presenting the customer bill presentation".

Through use of the technology described in U.S. Pat. No. 8,630,949 B2, it is possible to reduce man-hours in a process performed by persons for electronic application work, to thereby be able to improve the efficiency of work and reduce a cost required for the work.

SUMMARY OF THE INVENTION

In the technology described in U.S. Pat. No. 8,630,949 B2, it is required to set the numeric identifier and the bill type in advance. However, when there exist electronic applications that use documents having similar attributes but are different in contents to be examined, there is a fear that a user may be unable to appropriately associate the numeric identifier with the bill type. It is also conceivable that the numeric identifier may not be included. There is also a possibility that the numeric identifier is changed due to, for example, a change in format of the bill.

Therefore, according to the related art, an optimum template cannot be selected, thereby lowering extraction accuracy of an attribute, and hence effects of improving the efficiency of work and reducing the cost required for the work are low.

This invention provides a computer, a document identification method, and a system, which enable an attribute to be extracted with high accuracy.

The present invention can be appreciated by the description which follows in conjunction with the following figures, wherein: a computer, which is configured to extract an attribute being a character string indicating a feature of a paper-based document, the computer comprising a processor, and a storage device coupled to the processor. The storage apparatus is configured to store: template information for managing a plurality of templates in each of which at least one type of attribute is defined; and dictionary information for defining a character string to be extracted as the attribute. The template information includes a plurality of entries each formed of: identification information on each of the plurality of templates; identification information indicating each of the at least one type of attribute; and positional information indicating a position on a paper surface of an attribute corresponding to each of the at least one type of attribute. The computer is configured to: execute character recognition processing on image data on the paper-based document; extract an attribute corresponding to each of the at least one type of attribute, which is defined in each of the plurality of templates, through use of a result of the character recognition processing and the plurality of templates; calculate a score regarding the extracted attribute for each of the plurality of templates through use of the dictionary information, the template information, and the extracted attribute; select one of the plurality of templates that has the highest extraction accuracy of the attribute based on the score; and generate output information including the attribute extracted through use of the selected template.

According to this invention, it is possible to extract an attribute from a paper document with high accuracy. Problems, configurations, and effects other than described above will become apparent from a description of an embodiment below.

BRIEF DESCRIPTION OF THE DRAWINGS

The present invention can be appreciated by the description which follows in conjunction with the following figures, wherein:

FIG. 3 is a table for showing an example of a data structure of template information of the first embodiment, FIG. 4 is a table for showing an example of a data structure of word dictionary of the first embodiment, FIG. 8 is a table for showing an example of a data structure of an OCR element generated by the document examination module of the first embodiment, FIG. 9 is a table for showing an example of a data structure of a feature vector generated by the document examination module of the first embodiment, FIG. 14 is a diagram for illustrating an example of a template input screen displayed by the computer according to the first embodiment.

DETAILED DESCRIPTION OF THE PREFERRED EMBODIMENTS

Figure 1:
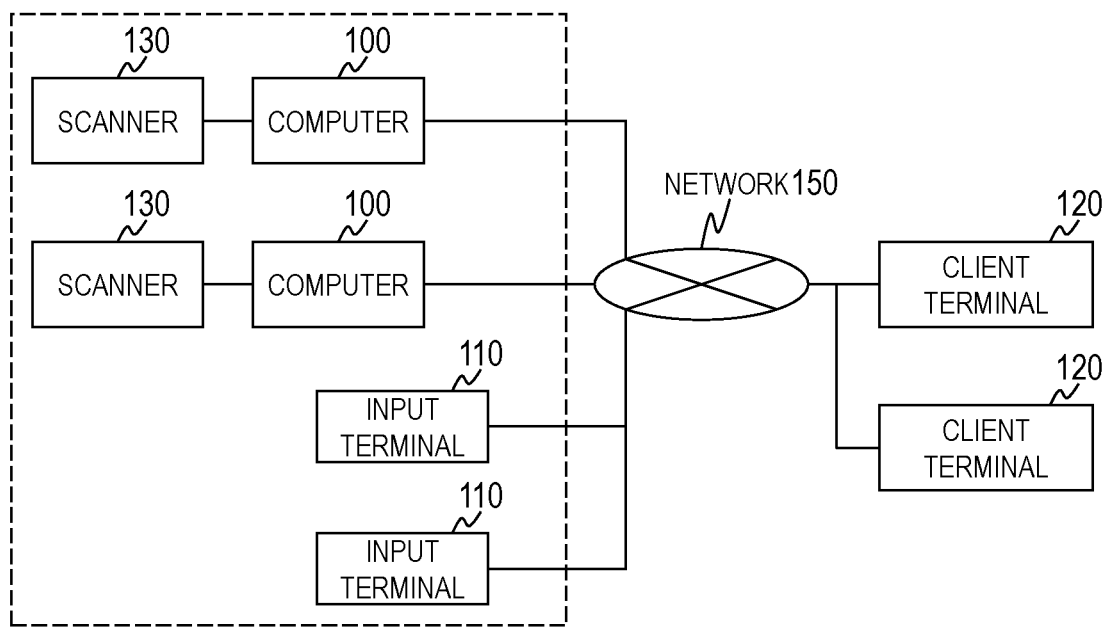
FIG. 1 is a diagram for illustrating a configuration example of a system according to a first embodiment of this invention.

Now, an embodiment of this invention is described with reference to the accompanying drawings.

In the drawings for illustrating the embodiment, portions having the same function are denoted by the same reference symbol, and duplicate descriptions thereof are omitted. The embodiment described herein does not limit the invention as defined in the appended claims. Not all of components described in the embodiment and combinations thereof are always indispensable for solutions of this invention.

In the following description, an expression of "xxx table" is sometimes used as an example of information, but any kind of data structure of information may be used. In other words, in order to indicate that the information does not depend on the data structure, the "xxx table" may be paraphrased as "xxx information". In the following description, a structure of each table is merely an example, and one table may be divided into at least two tables, or all or a part of at least two tables may be combined into one table.

First Embodiment

FIG. 1 is a diagram for illustrating a configuration example of a system according to a first embodiment of this invention.

The system includes a computer 100, an input terminal 110, a client terminal 120, and a scanner 130. The computer 100, the input terminal 110, and the client terminal 120 are coupled to one another through a network 150. The scanner 130 is coupled to the computer 100.

This invention has no limitations on the kind of the network 150. Conceivable examples of the network 150 include a local area network (LAN) and a wide area network (WAN). This invention also has no limitations on a coupling method of the network 150, and any one of a wireless network and a wired network may be employed. The scanner 130 may be directly coupled to the computer 100, or may be coupled to the computer 100 through a network.

The numbers of computers 100, input terminals 110, client terminals 120, and scanners 130 included in the system according to one embodiment of this invention can be set freely.

The computer 100 executes processing relating to an electronic application.

The client terminal 120 is a terminal to be operated by a user (applicant) who files the electronic application. The user operates the client terminal 120 to input a document required for the electronic application. The user may submit the document directly to a company or an administrative facility with which the electronic application is to be filed. This invention has no limitations on the kind of document to be handled. Conceivable examples of the document include a bill, a receipt, a withholding tax statement, and a tax notice.

The document to be input at a time of the electronic application includes a plurality of attributes being character strings to be used for examination of the electronic application. For example, when the document is a bill, character strings of: a billing amount; a biller; a billing address; information for designating a transfer destination, which includes a bank name, a branch name, an account type, and an account number; and other such information are included as the attributes. In the first embodiment, the attributes are managed by associating types of the attributes (names of the attributes) with character strings extracted as the attributes.

The input terminal 110 is a terminal operated by an administrator who manages the computer 100. The scanner 130 generates document image data 701 illustrated in FIG. 7 from a paper document. Conceivable examples of the scanner 130 include a flatbed scanner and an automatic sheet feeding scanner.

A digital camera configured to obtain an image through use of a charge coupled device (CCD) or other such element may be provided in place of the scanner 130.

Figure 2:
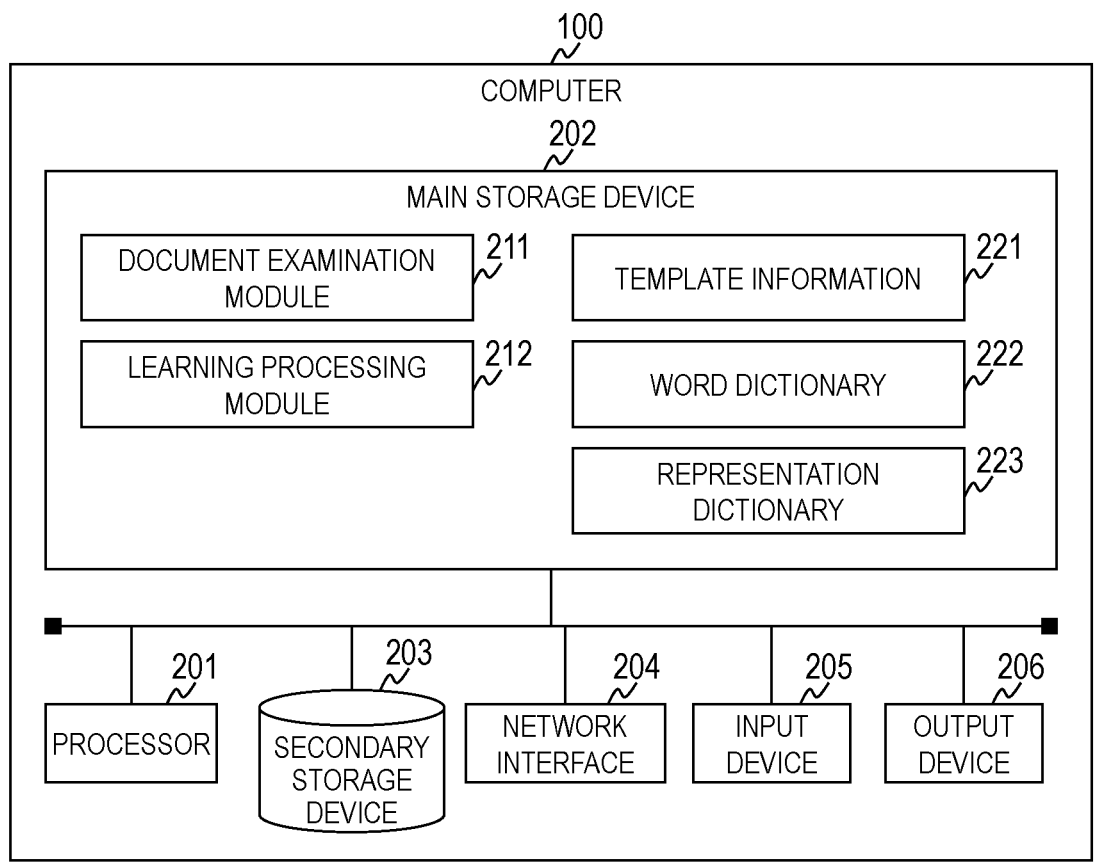
FIG. 2 is a diagram for illustrating a hardware configuration and a software configuration of a computer according to the first embodiment.

FIG. 2 is a diagram for illustrating a hardware configuration and a software configuration of the computer 100 according to the first embodiment.

The computer 100 includes a processor 201, a main storage device 202, a secondary storage device 203, a network interface 204, an input device 205, and an output device 206. The respective hardware components are coupled to one another through an internal path or the like. In FIG. 2, each of the numbers of the respective hardware components is one, but may be at least two.

The input terminal 110 and the client terminal 120 have the same hardware configuration as that of the computer 100.

The processor 201 executes a program stored in the main storage device 202. The processor 201 executes processing in accordance with the program, to thereby operate as a module for implementing a specific function. In the following description, a case in which processing is described as being performed by the module indicates that a program for implementing the relevant module is being executed by the processor 201.

The main storage device 202 stores a program to be executed by the processor 201 and information to be used by the program. The main storage device 202 also includes a work area to be temporarily used by the program. Conceivable examples of the main storage device 202 include a memory.

The main storage device 202 of the first embodiment stores programs for implementing a document examination module 211 and a learning processing module 212. The main storage device 202 also stores template information 221, a word dictionary 222, and a representation dictionary 223.

The document examination module 211 executes processing for the examination of an electronic application. The processing executed by the document examination module 211 is described later. The learning processing module 212 executes learning processing relating to a data selection method, a data extraction method, and a data classification method. For machine learning algorithms, there are known a logistic regression, a decision forest, a decision jungle, a boosted decision tree, a neural network, an averaged perceptron, a support vector machine, a locally deep support vector machine, a Bayes point machine, and other such algorithm.

The template information 221 is information for managing a template for reading out a character string to be used for the examination of a document from the document. The template information 221 is described in detail with reference to FIG. 3. The word dictionary 222 and the representation dictionary 223 are information for defining a character string to be extracted as an attribute, and are also information to be used when a score is calculated as described later. The word dictionary 222 is described in detail with reference to FIG. 4, and the representation dictionary 223 is described with reference to FIG. 5.

The secondary storage device 203 permanently stores data. Conceivable examples of the secondary storage device 203 include a hard disk drive (HDD) and a solid-state drive (SSD). The programs and information stored in the main storage device 202 may be stored in the secondary storage device 203. In this case, the processor 201 reads out the programs and the information from the secondary storage device 203, and loads the programs and the information onto the main storage device 202.

A network interface 204 is an interface for coupling to another apparatus through a network.

The input device 205 is a device for inputting data to the computer 100. For example, the input device 205 includes a keyboard, a mouse, and a touch panel.

The output device 206 is a device for outputting an input screen for data, a processing result, and other such information. For example, the output device 206 includes a touch panel and a display.

FIG. 3 is a table for showing an example of a data structure of the template information 221 of the first embodiment.

The template information 221 includes an entry formed of a template number 301, an attribute 302, and positional information 303. One entry corresponds to one template. One entry also includes at least one row of an attribute defined by the template.

The template number 301 is a field for storing identification information for uniquely identifying a template. In the first embodiment, the identification information on the template is also used as identification information on the entry. The attribute 302 is a field for storing an identification name indicating a type of attribute included in the template. The positional information 303 is a field for storing information on a position on a paper surface of an attribute corresponding to the type of attribute. For example, the positional information 303 stores coordinates of the top right and top left of a rectangular region. The coordinates may be relative coordinates, or may be absolute coordinates. The positional information 303 may also store information for designating a plurality of positions.

This invention has no limitations on the information stored in the positional information 303. For example, the entry may include fields for storing, for example, a length of the attribute and a range in which the attribute is described.

FIG. 4 is a table for showing an example of a data structure of the word dictionary 222 of the first embodiment.

The word dictionary 222 is information for defining a word to be extracted as an attribute, and includes an entry formed of an attribute 401 and a character string 402. One entry corresponds to one attribute.

The attribute 401 stores the identification name of the attribute. The character string 402 stores a word (character string) classified as the attribute 401.

Figures 5, 6:
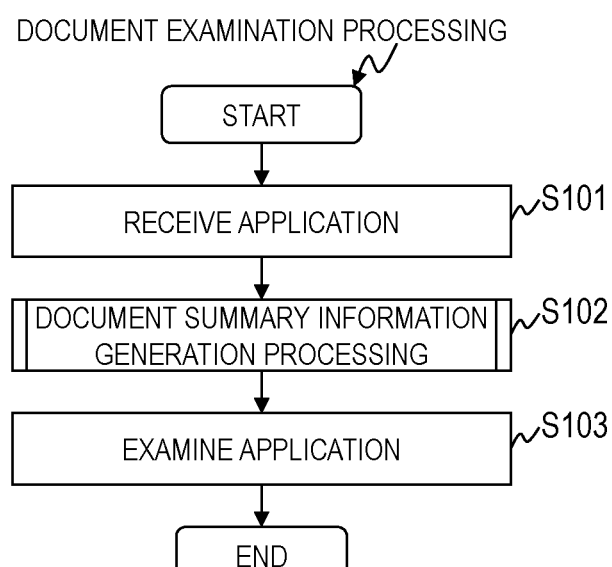
FIG. 5 is a table for showing an example of a data structure of representation dictionary of the first embodiment.
FIG. 6 is a flowchart for illustrating an outline of processing executed by the computer according to the first embodiment.

FIG. 5 is a table for showing an example of a data structure of the representation dictionary 223 of the first embodiment.

The representation dictionary 223 is information for defining a character string corresponding to a numeric value to be extracted as an attribute, and includes an entry formed of an attribute 501 and a representation 502. One entry corresponds to one attribute.

The attribute 501 stores the identification name of the attribute. The representation 502 stores a representation rule of the value (character string) classified as the attribute 501.

FIG. 6 is a flowchart for illustrating an outline of processing executed by the computer 100 according to the first embodiment.

The document examination module 211 of the computer 100 receives a request for an electronic application from the client terminal 120 operated by the user (Step S101). The request for the electronic application includes the document image data 701 on a document to be examined, which is illustrated in FIG. 7.

In a case where the document image data 701 is stored in an external storage apparatus, the user may include identification information on the document image data 701 in the request for the electronic application. The user may also submit a paper document. In a case where the paper document is submitted, the computer 100 scans the paper document through use of the scanner 130 to generate the document image data 701.

Subsequently, the document examination module 211 of the computer 100 executes document summary information generation processing (Step S102).

Figure 7:
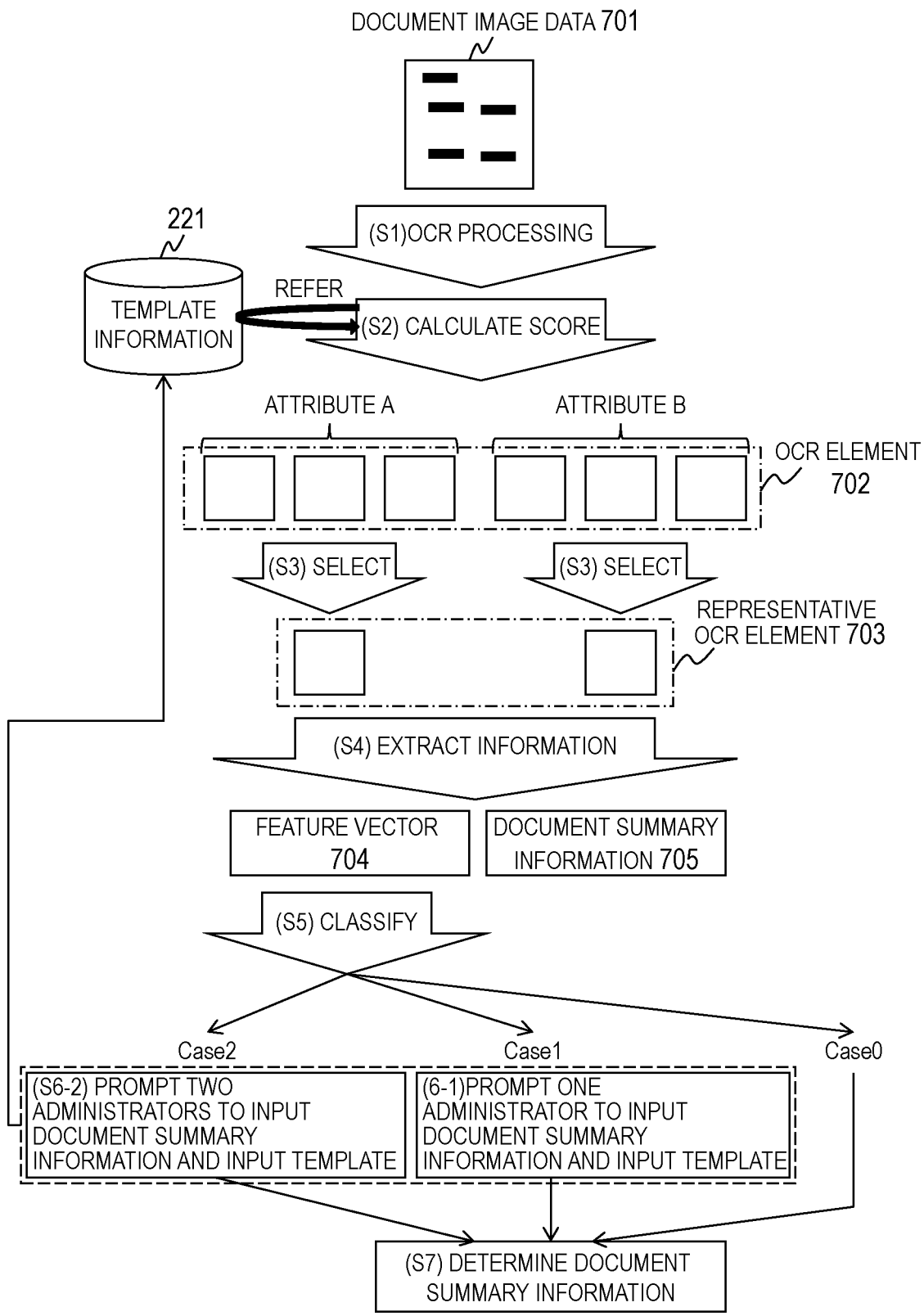
FIG. 7 is a diagram for illustrating an outline of document summary information generation processing executed by a document examination module of the first embodiment.

In the document summary information generation processing, document summary information 705 illustrated in FIG. 7 is generated. The document summary information 705 is information obtained by aggregating attributes extracted from the document corresponding to the document image data 701. In a case where the document image data 701 corresponds to a bill, the document summary information 705 includes attributes (character strings) corresponding to: a billing amount; information for identifying a transfer destination, which includes a bank name, a branch name, an account type, an account number, a biller's name, and a recipient's name; and other such information. In a case where the document image data 701 corresponds to a receipt, the document summary information 705 includes attributes (character strings) corresponding to: an amount; a name of a person or an organization that has purchased an article or has taken a service; a name of a person or an organization that has sold an article or has offered a service; and other such information. In a case where the document image data 701 corresponds to a withholding tax statement, the document summary information 705 includes attributes (character strings) corresponding to a name of a person, a name of an organization to which the person belongs, an income of the person, a withholding tax amount of the person, and other such information.

The document summary information generation processing is described in detail with reference to FIG. 7 to FIG. 13.

The computer 100 examines the electronic application through use of the document summary information 705 (Step S103). The computer 100 outputs any one of responses of "accept" and "reject" to the user as a result of the examination.

FIG. 7 is a diagram for illustrating an outline of the document summary information generation processing executed by the document examination module 211 of the first embodiment. FIG. 8 is a table for showing an example of a data structure of an OCR element generated by the document examination module 211 of the first embodiment. FIG. 9 is a table for showing an example of a data structure of a feature vector generated by the document examination module 211 of the first embodiment.

In Step S1, in a case where the document image data 701 is input, the document examination module 211 executes OCR processing on the document image data 701.

In Step S2, the document examination module 211 calculates a score regarding the attribute included in each template through use of a result of the OCR processing and the template information 221. As described later, in the first embodiment, a plurality of scores are calculated for one attribute. The document examination module 211 generates an OCR element 702 having an attribute and scores associated with each other. One of the rectangles illustrated in FIG. 7 corresponds to one OCR element 702.

As shown in FIG. 8, the OCR element 702 is formed of an attribute 801, an item value 802, a position 803, and a score 804.

The attribute 801 is a field for storing the identification name of an attribute. The item value 802 is a field for storing the attribute (character string) extracted from the document. The position 803 stores a position of the attribute on the paper surface. The score 804 is a field group for storing scores related to the attribute (character string) extracted through use of the template.

In the first embodiment, a representation score, a word score, a position score, an area score, an item score, and an appearance count score are calculated.

The representation score is a value indicating a degree to which the attribute matches a representation rule registered in the representation dictionary 223. The word score is a value indicating a degree to which the attribute matches the word registered in the word dictionary 222.

The position score is a value indicating a degree to which a position of the attribute in the document image data 701 deviates from a position of the attribute in the template. The area score is a value related to the area of a rectangular region including the attribute. The item score is a value related to a distance between the attributes having the same type of attribute. The appearance count score is a value regarding an appearance count of the attribute.

The first embodiment has a feature that not only the score indicating a similarity degree and the like of a character string based on a dictionary but also the score regarding the position of the character string are calculated. It should be noted that not all of the representation score, the word score, the position score, the area score, the item score, and the appearance count score may be included in the OCR element 702. For example, only the representation score, the word score, and the position score may be included in the OCR element 702.

In Step S3, the document examination module 211 selects a template suitable for generating the document summary information 705 based on the OCR elements 702 of each template. The document examination module 211 then selects a representative OCR element 703 from among the OCR elements 702 of each type of attribute included in the selected template. One of the rectangles illustrated in FIG. 7 corresponds to one representative OCR element 703. In a case where the selected template includes three kinds of attributes, three representative OCR elements 703 are selected.

In Step S4, the document examination module 211 uses the representative OCR element 703 to calculate a feature vector 704 and generate the document summary information 705.

In the first embodiment, as shown in FIG. 9, a vector having scores of each representative OCR element 703 as its components is generated as the feature vector 704. Meanwhile, the document summary information 705 is generated by aggregating the attribute 801, the item value 802, and the like of the representative OCR element 703.

The following problem also exists separately from the problems described in the "SUMMARY OF THE INVENTION" section. In the related art, a template is used to generate information corresponding to document summary information. However, the relevant information is not always information that can be used for the examination of the electronic application. Therefore, in the first embodiment, the document examination module 211 evaluates reliability of the generated document summary information 705. With this configuration, it is possible to avoid suspension of work of the electronic application, and to reduce correction work and the like.

In Step S5, the document examination module 211 substitutes the feature vector 704 into an evaluation expression, to thereby calculate an evaluation value indicating the reliability of the document summary information 705, and classifies an operation method (class) for the document summary information 705 based on the calculated evaluation value. The evaluation expression is defined through use of one parameter. The parameter of the evaluation expression is assumed to be set in advance. As another method, the document examination module 211 may input the feature vector 704 to a classifier on which machine learning has been performed in advance, to thereby classify a class. In the first embodiment, it is classified into three classes of Case 0, Case 1, and Case 2.

In a case where the evaluation value is equal to or larger than a first threshold value, the operation method for the document summary information 705 is classified under the class of Case 0. In Case 0, the reliability of the document summary information 705 is high, and hence the generated document summary information 705 is not to be modified.

In a case where the evaluation value is smaller than the first threshold value and equal to or larger than a second threshold value, the operation method for the document summary information 705 is classified under Case 1. In Step S6-1, the document examination module 211 prompts one administrator to input document summary information. The administrator refers to the document image data 701 and the like to generate document summary information, and operates the input terminal 110 to input the document summary information to the computer 100.

In a case where the evaluation value is smaller than the second threshold value, the operation method for the document summary information 705 is classified under Case 2. In Step S6-2, the document examination module 211 prompts two administrators to input document summary information. The two administrators each refer to the document image data 701 and the like to generate document summary information, and operate the input terminal 110 to input the document summary information to the computer 100.

In Step S7, the document examination module 211 selects the document summary information to be used for the examination of the application.

In Case 0, the document summary information 705 generated by the document examination module 211 is selected.

In Case 1, the document examination module 211 determines whether or not the document summary information 705 generated by the document examination module 211 matches the document summary information generated by the administrator. In a case where the determination results in YES, the document examination module 211 selects the document summary information 705 generated by the document examination module 211. In a case where the determination results in NO, the document examination module 211 prompts the administrator who has input the document summary information or another administrator to modify the input document summary information or input new document summary information. In this case, the document examination module 211 selects the modified document summary information or the newly input document summary information.

In Case 2, the document examination module 211 determines whether or not the document summary information 705 generated by the document examination module 211 matches the document summary information generated by the two administrators. In a case where the determination results in YES, the document examination module 211 selects the document summary information 705 generated by the document examination module 211. In a case where the determination results in NO, the document examination module 211 prompts any one of the administrators who have input the document summary information or another administrator to modify the input document summary information or input new document summary information. In this case, the document examination module 211 selects the modified document summary information or the newly input document summary information.

Figure 10:
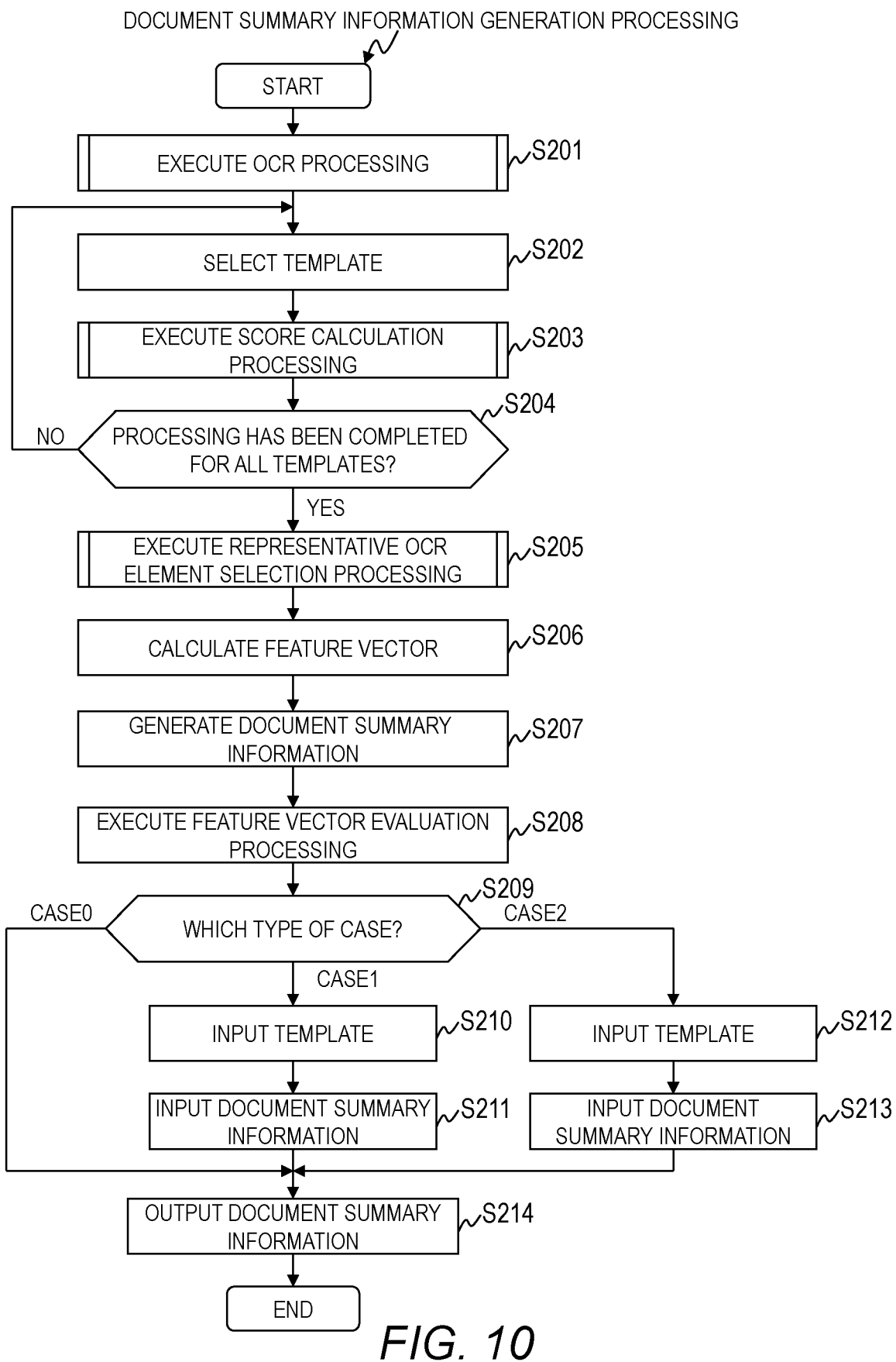
FIG. 10 is a flowchart for illustrating the document summary information generation processing executed by the document examination module 211 of the first embodiment.

FIG. 10 is a flowchart for illustrating the document summary information generation processing executed by the document examination module 211 of the first embodiment.

When the document image data 701 is input, the document examination module 211 starts the document summary information generation processing described below.

First, the document examination module 211 executes the OCR processing on the document image data 701 (Step S201). The OCR processing is described in detail with reference to FIG. 11. By the OCR processing, the document image data 701 is converted into data on a character string group that can be handled by a computer.

Subsequently, the document examination module 211 selects one template from the template information 221 (Step S202). For example, the document examination module 211 selects the template in order from the upper entry of the template information 221.

Subsequently, the document examination module 211 executes score calculation processing (Step S203). The score calculation processing is described in detail with reference to FIG. 12.

Subsequently, the document examination module 211 determines whether or not processing has been completed for all the templates (Step S204).

In a case where it is determined that processing has not been completed for all the templates, the document examination module 211 returns to Step S202 to execute the same processing.

In a case where it is determined that processing has been completed for all the templates, the document examination module 211 executes representative OCR element selection processing (Step S205). The representative OCR element selection processing is described in detail with reference to FIG. 13.

Subsequently, the document examination module 211 uses the representative OCR element 703 to generate the feature vector 704 (Step S206), and to generate the document summary information 705 (Step S207).

Subsequently, the document examination module 211 executes feature vector evaluation processing (Step S208), and classifies the operation method for the document summary information 705 under any one of the three classes of Case 0, Case 1, and Case 2 (Step S209).

In a case where the class is Case 0, the document examination module 211 outputs the document summary information 705 generated in Step S207 (Step S214). After that, the document examination module 211 brings the processing to an end.

In a case where the class is Case 1, the document examination module 211 receives the input of the template and the document summary information that are input by one administrator (Step S210 and Step S211). After that, in a case where the document summary information 705 generated in Step S207 matches the input document summary information, the document examination module 211 outputs the document summary information 705 (Step S214). In a case where the document summary information 705 generated in Step S207 does not match the input document summary information, the document examination module 211 outputs the input document summary information.

In a case where the class is Case 2, the document examination module 211 receives the input of the templates and two pieces of the document summary information that are input by two administrators (Step S212 and Step S213). After that, in a case where the document summary information 705 generated in Step S207 matches the two pieces of the input document summary information, the document examination module 211 outputs the document summary information 705 (Step S214). In a case where the document summary information 705 generated in Step S207 does not match the two pieces of the input document summary information, the document examination module 211 outputs the input document summary information.

Figure 11:
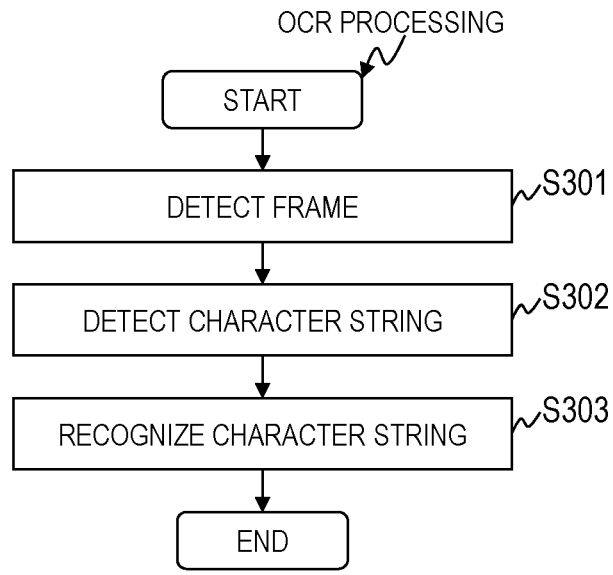
FIG. 11 is a flowchart for illustrating an example of OCR processing executed by the document examination module of the first embodiment.

FIG. 11 is a flowchart for illustrating an example of the OCR processing executed by the document examination module 211 of the first embodiment.

The document examination module 211 detects a frame (cell) from the document image data 701 (Step S301), and detects a region (character string region) in which a character string exists from a region outside the frame and a region inside the frame (Step S302). The character string region is detected as a rectangular region.

As the processing of Step S301 and Step S302, for example, the method described in JP 2004-171316 A is used.

Subsequently, the document examination module 211 uses a dictionary to execute processing for recognizing the character string included in the character string region (Step S303). As the processing for recognizing the character string, for example, the method described in F. Kimura et. al. "Modified quadratic discriminant functions and the application to Chinese character recognition" IEEE Transaction on Pattern Analysis and Machine Intelligence, vol. 9, pp. 149-153 is used. After that, the document examination module 211 brings the OCR processing to an end.

Figure 12:
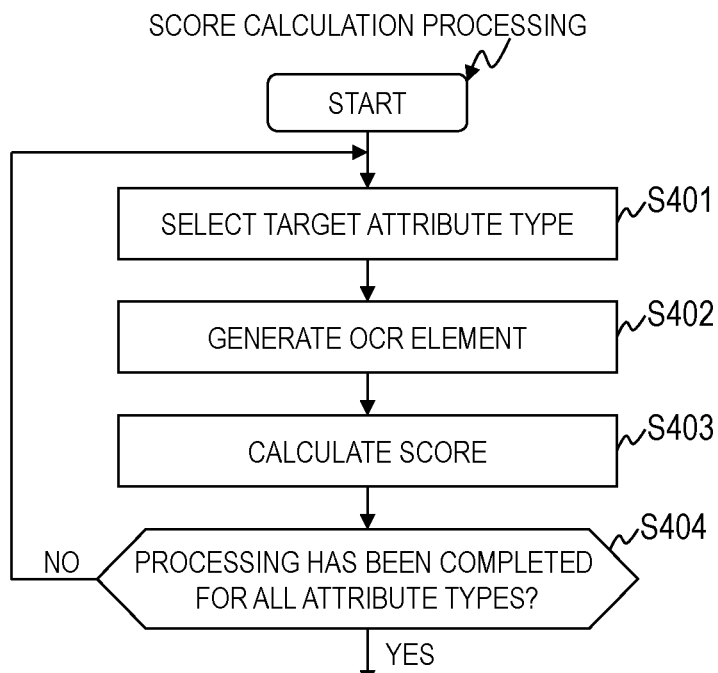
FIG. 12 is a flowchart for illustrating score calculation processing executed by the document examination module of the first embodiment.

FIG. 12 is a flowchart for illustrating the score calculation processing executed by the document examination module 211 of the first embodiment.

The document examination module 211 selects a target attribute type from among types of attributes included in the selected template (Step S401). In other words, one of the attributes 302 included in the entry corresponding to the selected template is selected.

Subsequently, the document examination module 211 generates the OCR element 702 corresponding to the target attribute type (Step S402). Specifically, the following processing is executed.

The document examination module 211 refers to the word dictionary 222 to retrieve an attribute (character string) matching or being similar to the character string 402 of the entry corresponding to the target attribute type from the document image data 701 subjected to the execution of the OCR processing. At this time, the document examination module 211 uses a thesaurus (not shown) to retrieve not only the same character string as the character string 402 but also an attribute (character string) having the same or similar meaning. The document examination module 211 also refers to the representation dictionary 223 to retrieve an attribute (character string) matching or being similar to the representation 502 of the entry corresponding to the target attribute type from the document image data 701 subjected to the execution of the OCR processing.

The document examination module 211 generates an empty OCR element 702, and sets the target attribute type in the attribute 801. The document examination module 211 sets the retrieved attribute in the item value 802, and sets the position of the retrieved attribute in the position 803. At this point in time, one OCR element 702 is generated for one retrieved attribute.

The document examination module 211 calculates a distance between the retrieved character strings based on the position 803 of the OCR element 702, and integrates the OCR elements 702 corresponding to the character strings exhibiting a distance equal to or smaller than a threshold value into one OCR element 702. In this case, a plurality of values are set in the item value 802 and the position 803 of the integrated OCR element 702.

When no attribute has been extracted even through use of any one of the word dictionary 222 and the representation dictionary 223, the document examination module 211 sets the target attribute type in the attribute 801, sets a blank in the item value 802 and the position 803, and sets all the values of the score 804 to "0". In another case, the document examination module 211 may determine the selected template as an inappropriate template, and bring the score calculation processing to an end. The processing of Step S402 is performed in the above-mentioned manner.

Subsequently, the document examination module 211 calculates the score for each OCR element 702 (Step S403). Specifically, the following processing is executed.

The document examination module 211 refers to the word dictionary 222 and the item value 802 to compare the character string 402 of the entry corresponding to the target attribute type and the attribute extracted through use of the word dictionary 222, and calculates the word score based on a result of the comparison. For example, the similarity degree of the character string is calculated as the word score. As a calculation method for the similarity degree or the like, for example, the method described in JP 2004-171316 A is used.

When there exists no attribute extracted by search processing using the word dictionary 222, the document examination module 211 sets "0" or other such default value as the word score.

The document examination module 211 refers to the representation dictionary 223 and the item value 802 to compare the representation 502 of the entry corresponding to the target attribute type and the attribute extracted through use of the representation dictionary 223, and calculates the representation score based on a result of the comparison. For example, a matching degree between at least one of representations set in the representation 502 and the attribute is calculated as the representation score. As a calculation method for the matching degree or the like, for example, the technology described in Takahashi et. al. "Development of a character path search method using recursive transition networks", The Institute of Electronics, Information and Communication Engineers, Technical Research Report, Vol. 109, No. 418, pp. 141-146 is used.

When there exists no attribute extracted by search processing using the representation dictionary 223, the document examination module 211 sets "0" or other such default value as the representation score.

The document examination module 211 calculates the appearance count score based on the appearance count of the attribute set in the item value 802. For example, the appearance count itself is calculated as the appearance count score. When at least two attributes are set in the item value 802, the appearance count score may be calculated through use of the appearance count of any one of the attributes. Any calculation method may be employed as long as a value that enables the evaluation of the appearance count is obtained.

The document examination module 211 uses the position 803 and the positional information 303 of a row corresponding to the target attribute type to calculate an error of the position of the attribute, and calculates the position score based on the error. In the first embodiment, a mathematical expression using the error as its parameter is used to calculate the position score. Any calculation method may be employed as long as a value that enables the evaluation of the error of the position of the attribute is obtained.

The document examination module 211 calculates the area score based on the size of the region of the attribute set in the item value 802. For example, the proportion of the region of the attribute on the paper, which corresponds to the document image data 701, is calculated as the area score. Any calculation method may be employed as long as a value that enables the evaluation of the size of the region of the attribute set in the item value 802 is obtained.

The document examination module 211 refers to the position 803 to calculate the distance between the attributes having the same type of attribute, and calculates the item score based on the distance. For example, the distance between the attribute extracted through use of the word dictionary 222 and the attribute extracted through use of the representation dictionary 223 is calculated. In the first embodiment, a mathematical expression using the reciprocal of the distance between the attributes as its parameter is used to calculate the item score. Any calculation method may be employed as long as a value that enables the evaluation of the positions of two attributes is obtained. In a case where the OCR element 702 has a plurality of attributes set in the item value 802, the item score is calculated based on the above-mentioned calculation method. Meanwhile, in a case where the OCR element 702 has one attribute set in the item value 802, "0" or other such default value is calculated as the item score.

The document examination module 211 sets the respective scores described above in the score 804 of the OCR element 702. The processing of Step S403 is performed in the above-mentioned manner.

Subsequently, the document examination module 211 determines whether or not processing has been completed for all the attribute types (Step S404).

In a case where it is determined that processing has not been completed for all the attribute types, the document examination module 211 returns to Step S401 to execute the same processing.

In a case where it is determined that the processing has been completed for all the attribute types, the document examination module 211 brings the score calculation processing to an end.

Figure 13:
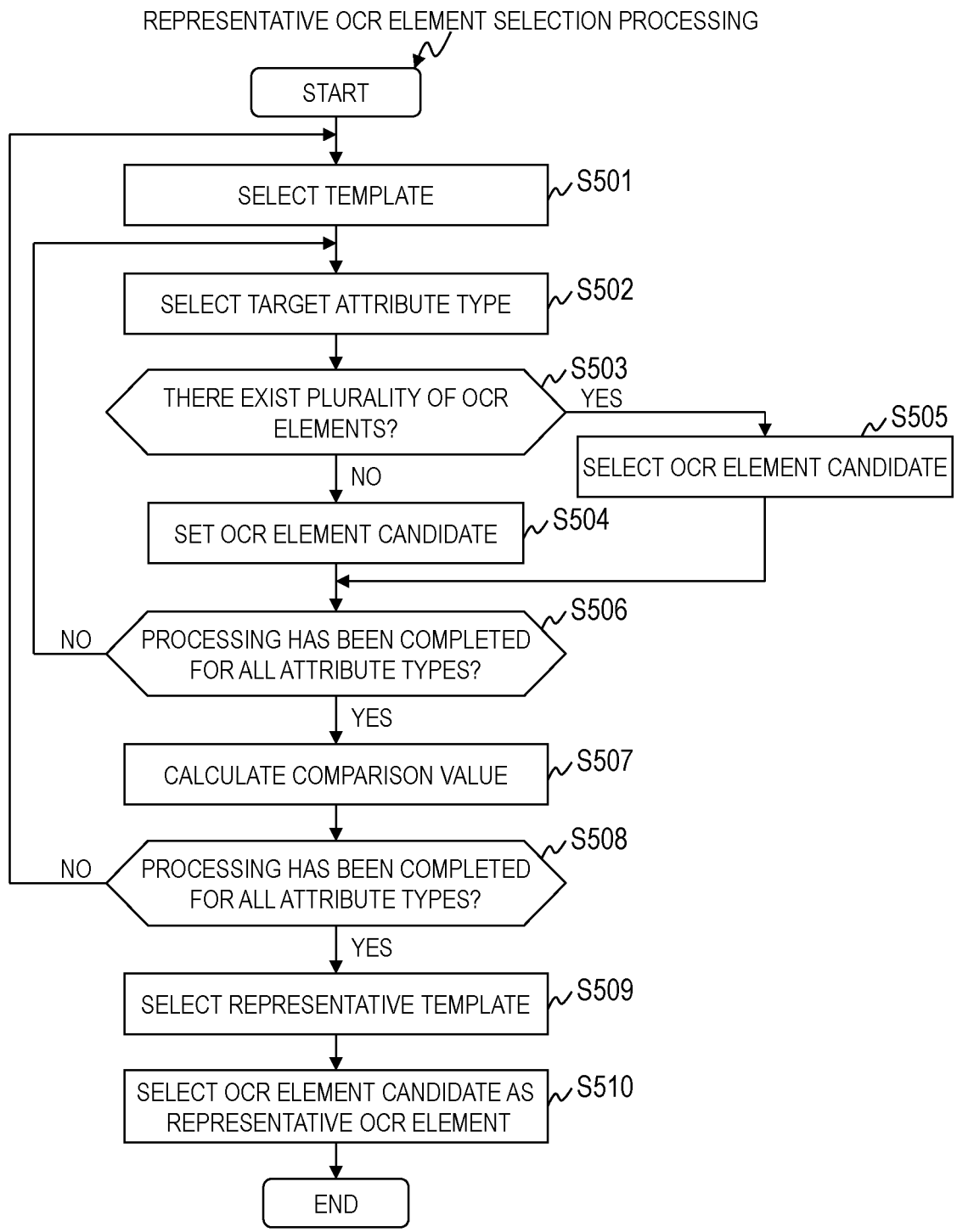
FIG. 13 is a flowchart for illustrating an example of representative OCR element selection processing executed by the document examination module of the first embodiment.

FIG. 13 is a flowchart for illustrating an example of the representative OCR element selection processing executed by the document examination module 211 of the first embodiment.

The document examination module 211 selects the template (Step S501). Further, the document examination module 211 selects the target attribute type from among the attribute types included in the selected template (Step S502).

The document examination module 211 determines whether or not there exist a plurality of OCR elements 702 corresponding to the target attribute type (Step S503). In other words, the document examination module 211 determines whether or not there exist at least two OCR elements 702 having the attribute 801 that matches the target attribute type.

In a case where it is determined that there exists one OCR element 702 corresponding to the target attribute type, the document examination module 211 sets the one OCR element 702 as an OCR element candidate (Step S504).

In a case where it is determined that there exist a plurality of OCR elements 702 corresponding to the target attribute type, the document examination module 211 selects one OCR element candidate from among the plurality of OCR elements 702 (Step S505).

For example, the document examination module 211 substitutes the score 804 of the OCR element 702 into a freely-selected mathematical expression, to thereby calculate the selection index, and selects the OCR element candidate based on the selection index. In this case, the OCR element 702 having the largest selection index is selected as the OCR element candidate. In another case, the document examination module 211 may select the OCR element candidate through use of a classifier on which machine learning has been performed.

In Step S506, the document examination module 211 determines whether or not the processing has been completed for all the attribute types included in the selected template (Step S506).

In a case where it is determined that the processing has not been completed for all the attribute types included in the selected template, the document examination module 211 returns to Step S502 to execute the same processing.

In a case where it is determined that the processing has been completed for all the attribute types included in the selected template, the document examination module 211 uses the OCR element candidate of the selected template to calculate a comparison value of the template (Step S507). For example, the comparison value is calculated based on a mathematical expression using the score 804 of the OCR element candidate as its parameter. The comparison value is a value for evaluating extraction accuracy of the attribute extracted through use of the template.

Subsequently, the document examination module 211 determines whether or not processing has been completed for all the templates (Step S508).

In a case where it is determined that processing has not been completed for all the templates, the document examination module 211 returns to Step S501 to execute the same processing.

In a case where it is determined that processing has been completed for all the templates, the document examination module 211 selects a representative template through use of the comparison values of the respective templates (Step S509). In this case, the template having the largest comparison value is selected as the representative template.

Subsequently, the document examination module 211 selects the OCR element candidate corresponding to the representative template as the representative OCR element 703 (Step S510). After that, the document examination module 211 brings the representative OCR element selection processing to an end.

Figures 15, 16:
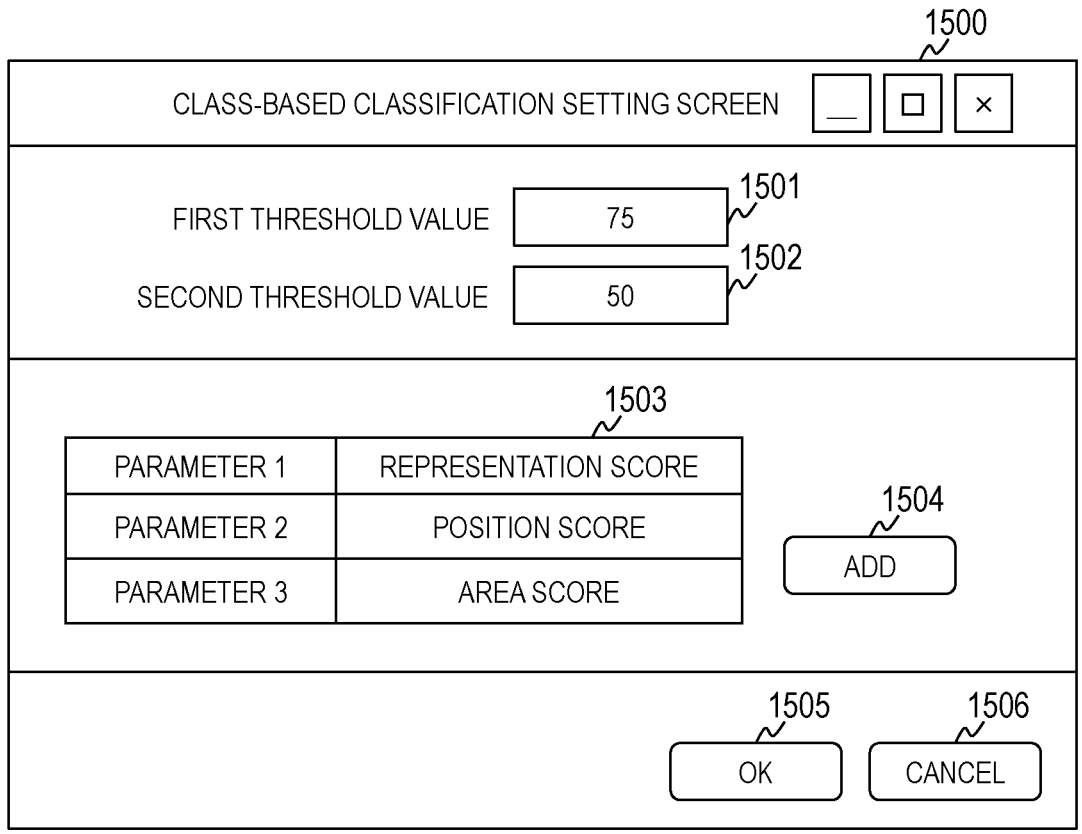
FIG. 15 is a diagram for illustrating an example of a class-based classification setting screen displayed by the computer according to the first embodiment.
FIG. 16 is a diagram for illustrating an example of an output screen displayed by the computer according to the first embodiment.

With reference to FIG. 14, FIG. 15, and FIG. 16, examples of screens displayed by the computer 100 are described.

FIG. 14 is a diagram for illustrating an example of a template input screen 1400 displayed by the computer 100 according to the first embodiment.

The template input screen 1400 is a screen for setting a template, and is displayed at a time of initial setting or in Step S210 and Step S212. The template input screen 1400 can be displayed at a freely-set timing in response to a request made by the administrator.

The template input screen 1400 includes an attribute setting field 1401, an add button 1402, a position setting field 1403, and a register button 1404.

The attribute setting field 1401 is a field for setting the type of attribute to be included in the template. The add button 1402 is a button for adding a row to the attribute setting field 1401. The position setting field 1403 is a field for setting the position of the attribute corresponding to the type of attribute, which is set in the attribute setting field 1401, on the paper surface. The register button 1404 is a button for setting the template input on the screen in the template information 221.

When the administrator operates the add button 1402, a row is added to the attribute setting field 1401. The administrator inputs a type of attribute to the added row. At this time, an icon for an attribute corresponding to the type of attribute set in the attribute setting field 1401 is displayed in the position setting field 1403. The administrator moves the icon to set the position and the range of the attribute corresponding to the type of attribute.

When the administrator operates the register button 1404, the computer 100 adds an entry to the template information 221, and sets an identification number for the template number 301 of the added entry. The computer 100 also generates as many rows as the number of types of attributes set in the attribute setting field 1401 in the added entry, and sets the values set in the attribute setting field 1401 in the respective rows. The computer 100 further sets a value in the positional information 303 of each row based on the position setting field 1403.

FIG. 15 is a diagram for illustrating an example of a class-based classification setting screen 1500 displayed by the computer 100 according to the first embodiment.

The class-based classification setting screen 1500 is a screen for setting a method of classification under a class, and is displayed at the time of the initial setting. The class-based classification setting screen 1500 can be displayed at a freely-set timing in response to a request made by the administrator.

The class-based classification setting screen 1500 includes a first threshold value setting field 1501, a second threshold value setting field 1502, a parameter setting field 1503, an add button 1504, an OK button 1505, and a cancel button 1506.

The first threshold value setting field 1501 and the second threshold value setting field 1502 are fields for setting threshold values to be used at a time of the classification under an operation method (class). The parameter setting field 1503 is a field for setting a parameter (for example, type of score) to be used for the selection of the representative OCR element 703 and the classification using the feature vector. The add button 1504 is a button for adding a row to the parameter setting field 1503. The OK button 1505 is a button for registering the values set in the respective input fields in the computer 100. The cancel button 1506 is a button for initializing the values set in the respective input fields.

FIG. 16 is a diagram for illustrating an example of an output screen 1600 displayed by the computer 100 according to the first embodiment.

The output screen 1600 is a screen for displaying a result of the examination of the electronic application, and is displayed after the examination of the electronic application is completed. The output screen 1600 can be displayed at a freely-set timing in response to a request made by the administrator or the user.

The output screen 1600 includes the result display table 1610. The result display table 1610 includes an entry formed of an ID 1611, an examination result 1612, document summary information 1613, a classification result 1614, and a score 1615.

The ID 1611 stores identification information for uniquely identifying an electronic application. For example, in a case of receiving an electronic application, the computer 100 assigns identification information to the electronic application. The examination result 1612 stores a result of the processing performed in Step S103. The document summary information 1613 stores an address, a URL, or other such information used for accessing the generated document summary information. The document summary information 705 itself may be stored in the document summary information 1613. The classification result 1614 stores a result of the classification performed in Step S209. The score 1615 stores a score or other such information used for the classification performed in Step S209. The value to be displayed as the score 1615 can be set freely.

According to one embodiment of this invention, the computer 100 can select the template based on the score that takes into consideration a deviation between the position of the attribute included in the template and the position of the attribute included in the document image data 701, the range of the attribute within the document image data 701, and other such factor. Therefore, it is possible to select an optimum template even when a correspondence relationship between a numeric identifier and a template is not set.

Further, it is possible to determine, based on the evaluation value indicating the reliability of the document summary information 705 generated through use of the template, whether or not it is required to modify the document summary information 705 or input new document summary information. With this configuration, it is possible to reduce the number of steps to be performed by the administrator, and to avoid unnecessary suspension or the like of work of the electronic application, which allows reduction in cost required for the electronic application.

The present invention is not limited to the above embodiment and includes various modification examples. In addition, for example, the configurations of the above embodiment are described in detail so as to describe the present invention comprehensibly. The present invention is not necessarily limited to the embodiment that is provided with all of the configurations described. In addition, a part of each configuration of the embodiment may be removed, substituted, or added to other configurations.

A part or the entirety of each of the above configurations, functions, processing units, processing means, and the like may be realized by hardware, such as by designing integrated circuits therefor. In addition, the present invention can be realized by program codes of software that realizes the functions of the embodiment. In this case, a storage medium on which the program codes are recorded is provided to a computer, and a CPU that the computer is provided with reads the program codes stored on the storage medium. In this case, the program codes read from the storage medium realize the functions of the above embodiment, and the program codes and the storage medium storing the program codes constitute the present invention. Examples of such a storage medium used for supplying program codes include a flexible disk, a CD-ROM, a DVD-ROM, a hard disk, a solid state drive (SSD), an optical disc, a magneto-optical disc, a CD-R, a magnetic tape, a non-volatile memory card, and a ROM.

The program codes that realize the functions written in the present embodiment can be implemented by a wide range of programming and scripting languages such as assembler, C/C++, Perl, shell scripts, PHP, and Java (registered trademark).

It may also be possible that the program codes of the software that realizes the functions of the embodiment are stored on storing means such as a hard disk or a memory of the computer or on a storage medium such as a CD-RW or a CD-R by distributing the program codes through a network and that the CPU that the computer is provided with reads and executes the program codes stored on the storing means or on the storage medium.

In the above embodiment, only control lines and information lines that are considered as necessary for description are illustrated, and all the control lines and information lines of a product are not necessarily illustrated. All of the configurations of the embodiment may be connected to each other.

What is claimed is:

1. A computer, which is configured to extract an attribute being a character string indicating a feature of a paper-based document, the computer comprising:
a processor; and
a storage device coupled to the processor, wherein:
the storage apparatus is configured to store:
template information for managing a plurality of templates in each of which at least one type of attribute is defined; and
dictionary information for defining a character string to be extracted as the attribute;
the template information includes a plurality of entries each formed of:
identification information on each of the plurality of templates;
identification information indicating each of the at least one type of attribute; and
positional information indicating a position on a paper surface of an attribute corresponding to each of the at least one type of attribute; and
the processor is configured to:
execute character recognition processing on image data on the paper-based document;
extract an attribute corresponding to each of the at least one type of attribute, which is defined in each of the plurality of templates, through use of a result of the character recognition processing and the plurality of templates;
calculate a score regarding the extracted attribute for each of the plurality of templates through use of the dictionary information, the template information, and the extracted attribute;
select one of the plurality of templates that has the highest extraction accuracy of the attribute based on the score; and
generate output information including the attribute extracted through use of the selected template.

2. The computer according to claim 1, wherein the processor is configured to:
generate a feature vector indicating a feature of the paper-based document through use of the score of the selected template;
calculate an evaluation value indicating reliability of the output information through use of the feature vector; and
determine, based on a result of comparing the evaluation value and a threshold value, whether one of modification of the output information and generation of new output information is required.

3. The computer according to claim 2, wherein the processor is configured to:
refer to the dictionary information to calculate a first score indicating a degree to which the extracted attribute matches a character string registered in the dictionary information;
refer to the template information to calculate a second score for evaluating a deviation between the positional information and a position of the extracted attribute on the paper surface; and
generate the feature vector including the first score and the second score of the extracted attribute as components of the feature vector.

4. The computer according to claim 3, wherein the processor is configured to:
calculate a third score for evaluating a size of a range of the extracted attribute on the paper surface;
calculate a fourth score for evaluating a distance between attributes having the same type of attribute; and
generate the feature vector including the first score, the second score, the third score, and the fourth score of the extracted attribute as components of the feature vector.

5. A document identification method, which is executed by a computer configured to extract an attribute being a character string indicating a feature of a paper-based document,
the computer including:
a processor; and
a storage device coupled to the processor,
the storage device being configured to store:
template information for managing a plurality of templates in each of which at least one type of attribute is defined; and
dictionary information for defining a character string to be extracted as the attribute,
the template information including a plurality of entries each formed of:
identification information on each of the plurality of templates;
identification information indicating each of the at least one type of attribute; and
positional information indicating a position on a paper surface of an attribute corresponding to each of the at least one type of attribute,
the document identification method including:
a first step of executing, by the processor, character recognition processing on image data on the paper-based document;
a second step of extracting, by the processor, an attribute corresponding to each of the at least one type of attribute, which is defined in each of the plurality of templates, through use of a result of the character recognition processing and the plurality of templates;
a third step of calculating, by the processor, a score regarding the extracted attribute for each of the plurality of templates through use of the dictionary information, the template information, and the extracted attribute;
a fourth step of selecting, by the processor, one of the plurality of templates that has the highest extraction accuracy of the attribute based on the score; and
a fifth step of generating, by the processor, output information including the attribute extracted through use of the selected template.

6. The document identification method according to claim 5, further including:
a sixth step of generating, by the processor, a feature vector indicating a feature of the paper-based document through use of the score of the selected template;
a seventh step of calculating, by the processor, an evaluation value indicating reliability of the output information through use of the feature vector; and
an eighth step of determining, by the processor, based on a result of comparing the evaluation value and a threshold value, whether one of modification of the output information and generation of new output information is required.

7. The document identification method according to claim 6, wherein:
the third step includes:

referring, by the processor, to the dictionary information to calculate a first score indicating a degree to which the extracted attribute matches a character string registered in the dictionary information; and referring, by the processor, to the template information to calculate a second score for evaluating a deviation between the positional information and a position of the extracted attribute on the paper surface; and the sixth step includes generating, by the processor, the feature vector including the first score and the second score of the extracted attribute as components of the feature vector.

8. The document identification method according to claim 7, wherein:

the third step includes:

calculating, by the processor, a third score for evaluating a size of a range of the extracted attribute on the paper surface; and calculating by the processor, a fourth score for evaluating a distance between attributes having the same type of attribute; and the sixth step includes generating, by the processor, the feature vector including the first score, the second score, the third score, and the fourth score of the extracted attribute as components of the feature vector.

9. A system, comprising:

a computer; and a terminal, the computer including:

a first processor; and a first storage device coupled to the first processor, the terminal including:

a second processor; and a second storage device coupled to the second processor, wherein:

the first storage device is configured to store:

template information for managing a plurality of templates in each of which at least one type of attribute being a character string indicating a feature of a paper-based document is defined; and dictionary information for defining a character string to be extracted as the attribute;

the template information includes a plurality of entries each formed of:

identification information on each of the plurality of templates;

identification information indicating each of the at least one type of attribute; and positional information indicating a position on a paper surface of an attribute corresponding to each of the at least one type of attribute;

the second processor is configured to input the paper-based document; and the first processor is configured to:

generate image data on the paper-based document input by the terminal;

execute character recognition processing on the image data;

extract an attribute corresponding to each of the at least one type of attribute, which is defined in each of the plurality of templates, through use of a result of the character recognition processing and the plurality of templates;

calculate a score regarding the extracted attribute for each of the plurality of templates through use of the dictionary information, the template information, and the extracted attribute;

select one of the plurality of templates that has the highest extraction accuracy of the attribute based on the score;

generate output information including the attribute extracted through use of the selected template; and output the output information to the terminal.

10. The system according to claim 9, wherein the first processor is configured to:

generate a feature vector indicating a feature of the paper-based document through use of the score of the selected template;

calculate an evaluation value indicating reliability of the output information through use of the feature vector;

determine, based on a result of comparing the evaluation value and a threshold value, whether one of modification of the output information and generation of new output information is required; and notify a user who operates the terminal that one of the correction of the output information and the creation of new output information is required, in a case where it is determined that one of the correction of the output information and the creation of new output information is required.

11. The system according to claim 10, wherein the first processor is configured to:

refer to the dictionary information to calculate a first score indicating a degree to which the extracted attribute matches a character string registered in the dictionary information;

refer to the template information to calculate a second score for evaluating a deviation between the positional information and a position of the extracted attribute on the paper surface; and generate the feature vector including the first score and the second score of the extracted attribute as components of the feature vector.

12. The system according to claim 11, wherein the first processor is configured to:

calculate a third score for evaluating a size of a range of the extracted attribute on the paper surface;

calculate a fourth score for evaluating a distance between attributes having the same type of attribute; and generate the feature vector including the first score, the second score, the third score, and the fourth score of the extracted attribute as components of the feature vector.

* * * * *